United States Patent
Almoric et al.

(10) Patent No.: US 7,646,531 B1
(45) Date of Patent: Jan. 12, 2010

(54) WAVELENGTH CONVERSION DEVICES HAVING MULTI-COMPONENT OUTPUT FACES AND SYSTEMS INCORPORATING THE SAME

(75) Inventors: Etienne Almoric, Fontainebleau (FR); Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/192,454

(22) Filed: Aug. 15, 2008

(51) Int. Cl.
G02F 1/35 (2006.01)
G02F 2/02 (2006.01)
G02B 6/10 (2006.01)
G02B 6/12 (2006.01)

(52) U.S. Cl. .................. 359/332; 359/326; 385/14; 385/122; 385/131; 385/132; 372/22

(58) Field of Classification Search ......... 359/326–332; 385/14, 122, 129–132; 372/22
See application file for complete search history.

(56) References Cited

U.S. PATENT DOCUMENTS

| | | | |
|---|---|---|---|
| 5,619,369 A | 4/1997 | Yamamoto et al. | |
| 5,909,456 A | 6/1999 | Oka | |
| 5,970,077 A | 10/1999 | Hill | |
| 6,181,461 B1 | 1/2001 | Wada et al. | |
| 2004/0233512 A1 * | 11/2004 | Fujioka et al. | 359/326 |
| 2006/0165138 A1 | 7/2006 | Kachanov et al. | |
| 2009/0190624 A1 * | 7/2009 | Almoric et al. | 372/107 |
| 2009/0219954 A1 * | 9/2009 | Gollier | 372/9 |

OTHER PUBLICATIONS

Huang et al., "Light Propagation Characteristics in Various Dielectric Waveguides", Chinese Journal of Physics, vol. 24, No. 2, Summer 1986.

* cited by examiner

*Primary Examiner*—Uyen-Chau N Le
*Assistant Examiner*—Daniel Petlovsek
(74) *Attorney, Agent, or Firm*—Kwadjo Adusei-Poku

(57) ABSTRACT

The present invention relates generally to wavelength conversion devices and laser projection systems incorporating the same. According to one embodiment of the present invention, wavelength conversion devices are provided without limitation of their field of use to laser projection systems. For example, the wavelength conversion device may comprise a waveguide region comprising a relatively linear waveguide portion and a pair of lateral planar waveguide portions. The output face of the wavelength conversion device comprises a multi-component output face comprising a core portion and a pair of lateral portions. The lateral portions of the output face are configured to be relatively non-transmissive and the waveguide region is structured such that an optical signal propagating along the waveguide region will define relatively low intensity laterally distributed parasitic light in substantial alignment with the lateral planar waveguide portions along the lateral, non-transmissive portions of the output face. Additional embodiments are disclosed and claimed.

16 Claims, 2 Drawing Sheets

WAVELENGTH CONVERSION DEVICES HAVING MULTI-COMPONENT OUTPUT FACES AND SYSTEMS INCORPORATING THE SAME

BACKGROUND OF THE INVENTION

The present invention relates generally to semiconductor lasers and, more particularly, to planar waveguide wavelength conversion devices and laser projection systems incorporating such conversion devices.

SUMMARY OF THE INVENTION

The present invention relates generally to semiconductor lasers, wavelength conversion devices, and the other optical components that can be used in laser projection systems including a short wavelength source. Short wavelength sources can be configured for use in a laser projection system by combining a single-wavelength semiconductor laser, such as, for example, a distributed feedback (DFB) laser, a distributed Bragg reflector (DBR) laser, or a Fabry-Perot laser, with a wavelength conversion device, such as, for example, a second harmonic generation (SHG) crystal. The SHG crystal can be configured to generate higher harmonic waves of the fundamental laser signal by tuning, for example, a 1060 nm DBR or DFB laser to the spectral center of an SHG crystal, such as, for example, MgO-doped periodically poled lithium niobate (PPLN), which converts the wavelength to 530 nm. It is contemplated that wavelength conversion devices for use in the context of the present invention may comprise PPLN SHG crystals, other types of conventional or yet to be developed SHG crystals, or any other type of conventional or yet to be developed wavelength conversion device. For example, alternative second harmonic generating materials include, for example, conventional or yet-to-be developed non-linear optical materials, photonic crystal slabs, chiral materials, etc.

The output of the wavelength conversion device can be influenced significantly by parasitic light generated as the fundamental signal propagates through the waveguide region of the wavelength conversion device 10. More specifically, referring to FIGS. 1 and 2, the geometrical configuration of the wavelength conversion device 10 according to the present invention defines a waveguide region 12 formed by a relatively thin layer of periodically poled LiNbO$_3$, or some other suitable second harmonic generating material, sandwiched between two low index cladding layers 14. In some embodiments, the wavelength conversion device 10 is assembled by attaching low index cladding layers 14 to respective blocks of LiNbO$_3$. Typically, the dimensions of the relatively linear waveguide portion 12A are on the order of a few microns in the vertical direction and less than ten microns in the lateral direction, although dimensional variations from these references are contemplated. More generally, it is contemplated that the layer of second harmonic generating material may have a thickness dimension of between approximately two μm and approximately ten μm, although other dimensions would also be functional. FIGS. 1 and 2 also illustrate the use of upper and lower body portions adjacent to the two low index cladding layers. These body portions are presented primarily for their structural, as opposed to optical, functionality and may be excluded from the device.

Two low index optical trenches 16 are disposed on opposite sides of the relatively linear waveguide portion and extend between the input face 11 and the output face 13 of the device 10 along the propagating direction and guide the propagating signal in a relatively linear waveguide portion 12A of the waveguide region 12 by helping to confine propagating modes into the relatively linear waveguide portion 12A and limit propagation in the lateral planar waveguide portions 12B of the waveguide region 12. As is illustrated in FIGS. 1 and 2, the layer of second harmonic generating material and the pair of relatively low index cladding layers 14 extend laterally so as to span the relatively linear waveguide portion 12A and the pair of lateral planar waveguide portions 12B across the entire width of the wavelength conversion device 10. However, in practicing the present invention, it may be suitable to merely ensure that the layer of second harmonic generating material extends laterally into the pair of lateral planar waveguide portions 12B along a distance which is typically in the mm range, although other dimensions would also be functional. The relatively low index optical trenches 16 can be spaced on opposite sides of the relatively linear waveguide portion 12A by between approximately two μm and approximately ten μm and can extend about one μm to about 5 μm into the thickness dimension of the second harmonic generating material, again, with other dimensions also contemplated as being functional.

The present inventors have recognized that light propagating in the relatively linear waveguide portion 12A is typically subject to significant scattering, which is sometimes referred to as waveguide dispersion. As is illustrated in FIG. 2, most of this stray light escapes from the relatively linear waveguide portion 12A but remains mostly trapped in the pair of lateral planar waveguide portions 12B. As a consequence, as is illustrated schematically in FIG. 2, the near field of the wavelength conversion device comprises a bright emitting spot 15 made of the light that propagated without significant scattering and laterally distributed parasitic light 17 consisting of the light that has been scattered and trapped in the lateral planar waveguide portions 12B. This parasitic light differs from that which is generated due so-called multimodal propagation effect. Indeed, in some cases, linear waveguides can guide multiple modes in addition to the fundamental mode. Those modes remain mostly concentrated in the linear waveguide while scattered light propagates away from that waveguide. Accordingly, in most cases, methods of filtering these two different sources of parasitic light will be very different. References herein to "parasitic" light or "scattered" light should not be read to include multimodal parasitic light.

The shape of the stray light 17 depends upon the manner in which light propagates in the wavelength conversion device 10. When an optical signal propagating along the relatively linear waveguide portion 12A is scattered, part of the light is transferred to the lateral planar waveguide portions 12B of the waveguide region 12 where the propagating modes are much less confined. The effective index of refraction $\eta_{EFF}$(B) in the lateral planar waveguide portions 12B effectively defines one preferential angle θ at which all scattered waves are in phase. This angle θ is given by the following relation:

$$\cos\theta = \frac{\eta_{EFF}(A)}{\eta_{EFF}(B)}$$

where θ is the scattering angle, $\eta_{EFF}$(A) is the effective index in the relatively linear waveguide portion 12A of the waveguide region 12, and $\eta_{EFF}$(B) is the effective index in the lateral planar waveguide portions 12B of the waveguide region 12.

As a result of this scattering, the present inventors have recognized that the typical far field of wavelength conversion devices 10 comprising the relatively linear and lateral planar waveguide portions 12A, 12B includes a few well-defined lateral intensity peaks, each corresponding to the scattering angles of the modes supported by the relatively linear waveguide region 12A. These lateral intensity peaks can disrupt the performance of many laser projection systems. The present inventors have recognized potentially beneficial schemes for reducing the impact of these lateral intensity peaks.

According to one embodiment of the present invention, a laser projection system is provided comprising a laser source, a wavelength conversion device, and beam projection optics. The output face of the wavelength conversion device comprises a multi-component output face defining varying degrees of relative optical transmittance.

According to another embodiment of the present invention, wavelength conversion devices are provided without limitation of their field of use to laser projection systems. For example, the wavelength conversion device may comprise a waveguide region comprising a relatively linear waveguide portion and a pair of lateral planar waveguide portions. The output face of the wavelength conversion device comprises a multi-component output face comprising a core portion and a pair of lateral portions. The lateral portions of the output face are configured to be relatively non-transmissive and the waveguide region is structured such that an optical signal propagating along the waveguide region will define relatively low intensity laterally distributed parasitic light in substantial alignment with the lateral planar waveguide portions along the lateral, non-transmissive portions of the output face.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
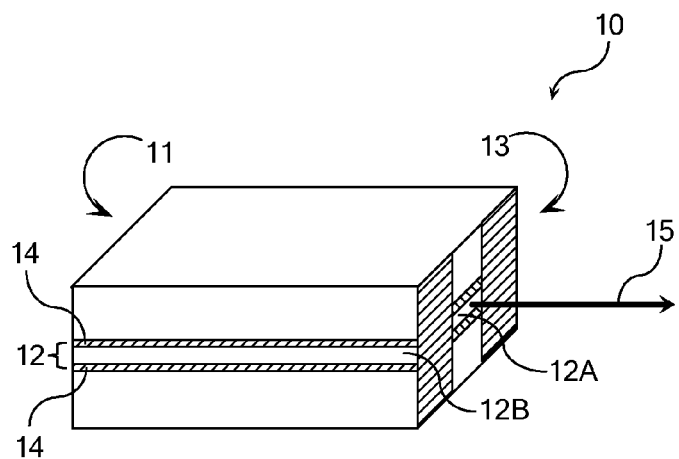
FIG. 1 is a schematic illustration of a wavelength conversion device according to one embodiment of the present invention.

Referring to FIGS. 1-4, the concepts of the present invention may be conveniently illustrated with general reference to a laser projection system 100 comprising a wavelength conversion device 10, a laser source 20, and beam projection optics 30 comprising, for example, a collimating lens 32 and a scanning mirror 34. The laser source 20 may comprise any of a variety of types of semiconductor or non-semiconductor lasers, including those noted above. Similarly, the beam projection optics 30 can embody a variety of scanning and non-scanning optical configurations from the relatively simple to the relatively complex including, for example, a two-axis, gimbal mounted, MEMS scanning mirror 34 configured to cooperate with the laser source to generate a two-dimensional single or multi-color scanned laser image on a projection screen 40 in the image field of the laser projection system 100. It is also contemplated that the beam projection optics can be configured as part of non-scanning optical systems such as spatial light modulator based systems (including digital light processing (DLP), transmissive LCD, and liquid crystal on silicon (LCOS) systems).

The light beam emitted by the semiconductor laser 20 can be either directly coupled into the waveguide of the wavelength conversion device 10 or can be coupled through collimating and focusing optics or some other type of suitable optical element or optical system. The wavelength conversion device 10 converts the incident light into higher harmonic waves and outputs the converted signal. As is noted above, this configuration is particularly useful in generating shorter wavelength laser beams from longer wavelength semiconductor lasers and, as such, can be used as a visible laser source for a single-color laser projection system or for a multi-color RGB laser projection system.

The wavelength conversion device 10 comprises an input face 11, an output face 13, and the aforementioned waveguide region 12 extending from the input face 11 to the output face 13. The relatively thin waveguide region 12 is sandwiched between two lower index layers 14 to ensure light confinement in the vertical direction of FIG. 2. Two optical trenches 16 extend partially into the waveguide region 12 to help confine light in the lateral direction and define a relatively linear waveguide portion 12A of the waveguide region 12. Typically, most of the light emitted by the laser 20 is coupled into and remains confined in the relatively linear waveguide portion 12A. However, as light propagates in the relatively linear waveguide portion 12A, part of it is converted to a higher frequency through non linear optical effects, roughness and other irregularities and imperfections in the relatively linear waveguide portion 12A generate scattering of the frequency-converted light, which results in some leakage of power from the linear waveguide portion 12A. The low index layers 14 confine most of the light that is scattered into the lateral planar waveguide portions 12B located on both sides of the relatively linear waveguide portion 12A. The resulting near field pattern at the output face 13 of the wavelength conversion device 10 comprises a relatively high intensity spot 15 corresponding to light that has not been scattered and relatively low intensity laterally distributed light 17 corresponding to scattered or stray light.

One interesting property of the stray light is associated with the fact that light does not propagate at the same speed in the relatively linear waveguide portion 12A and the lateral planar waveguide portions 12B because both waveguide portions have different structures. As a consequence, the stray light is preferentially emitted in one direction corresponding to a scattering angle θ where the stray light is in phase with the light that is propagating into the linear waveguide. The scattering angle θ is given by the following equation:

$$\cos\theta = \frac{\eta_{EFF}(A)}{\eta_{EFF}(B)}$$

where θ is the scattering angle, $\eta_{EFF}(A)$ is the effective index in the relatively linear waveguide portion 12A of the waveguide region 12, and $\eta_{EFF}(B)$ is the effective index in the lateral planar waveguide portions 12B of the waveguide region 12.

Figure 3:
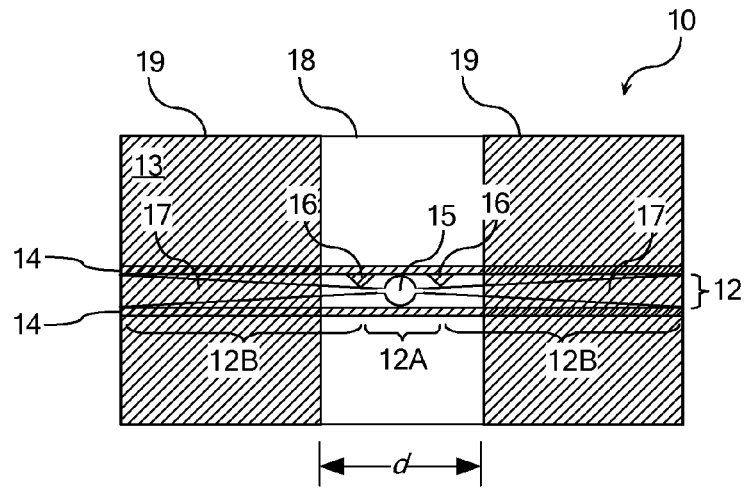
FIG. 3 is a schematic illustration of the output face of the wavelength conversion device illustrated in FIG. 1.
Figure 4:
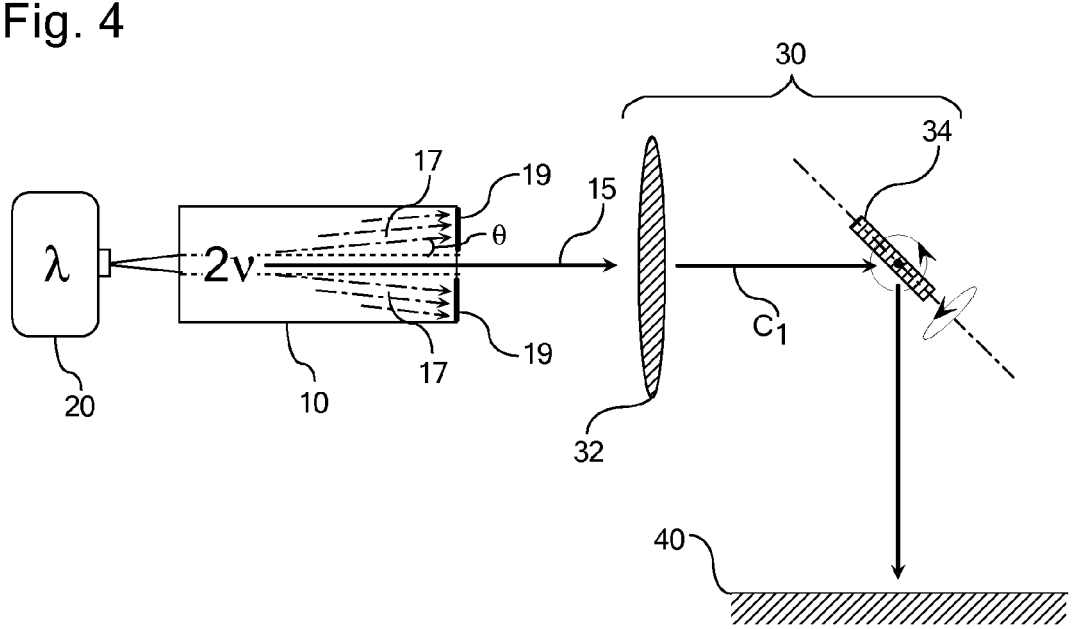
FIG. 4 is a schematic illustration of a laser projection system according to one embodiment of the present invention.

As is illustrated with further reference to FIGS. 1 and 3, to help alleviate the above-noted problems associated with the laterally distributed parasitic or stray light 17, the output face 13 is a multi-component output face that comprises a core portion 18 and a pair of lateral portions 19. The core portion 18 of the output face 13 is configured to be relatively transmissive to an optical signal propagating from the input face 11 to the output face 13 along the waveguide region 12. In contrast, the lateral portions 19 of the output face 13 are configured to be relatively non-transmissive to the propagating signal. For the purposes of describing and defining the present invention, it is noted that the relative degrees of transmittance of the different components 18, 19 of the output face will be a function of the particular preferences and requirements of those practicing the present invention. For example, in one application, it may be preferable to have the core portion 18 of the output face 13 be more than 99% transmissive, while the lateral portions 19 of the output face 13 are less than 1% transmissive, i.e., 99% non-transmissive. In less sensitive applications, it may be sufficient to operate with core and lateral portions 18, 19 that exhibit less contrast in transmissivity.

Figure 2:
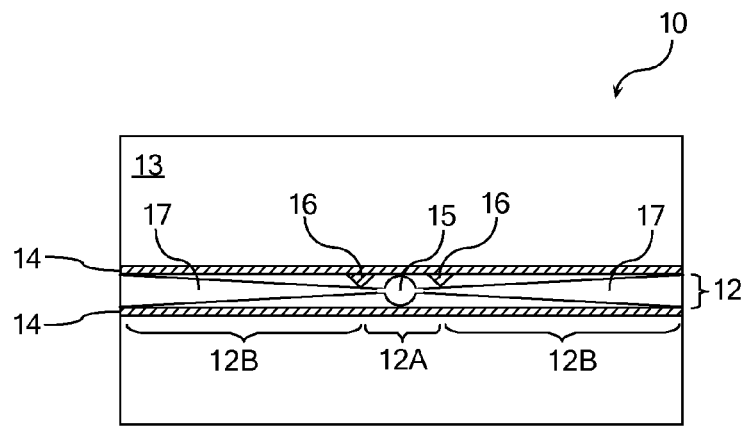
FIG. 2 is a schematic illustration of the manner in which light propagates to the output face of the wavelength conversion device illustrated in FIG. 1.

In any case, referring to FIGS. 2 and 3, the waveguide region 12 is structured such that an optical signal propagating from the input face 11 to the output face 13 will define a relatively high intensity spot 15 in substantial alignment with the relatively linear waveguide portion 12A along the core portion 18 of the output face 13 and will be subject to a degree of scattering to define relatively low intensity laterally distributed parasitic light 17 in substantial alignment with the lateral planar waveguide portions 12B along the lateral portions 19 of the output face 13. This stray light 17 is intercepted by the filtering slit formed by the relatively non-transmissive lateral portions 19 of the output face 13. As such, the wavelength conversion device 10 is configured to favor transmission of the relatively high intensity light 15, which is aligned with the relatively transmissive core portion 18 of the output face 13.

It is contemplated that the lateral portions 19 of the output face 13 can be rendered non-transmissive in a variety of conventional or yet-to-be developed ways without departing from the scope of the present invention. For example, the lateral portions 19 can be configured to reflect, scatter, absorb, or diffuse the stray light 17 and may comprise relatively non-transmissive roughened surface portions of the output face 13, coatings formed on the output face 13, compositional variations incorporated in the output face 13, etc.

It is noted that reference herein to the "relatively linear" waveguide portion 12A of the waveguide region 12 is not intended to define the waveguide portion 12A as perfectly linear. Rather, it is recognized that the "relatively linear" waveguide portion 12A will necessarily define a two-dimensional cross section and, to this end, may be somewhat planar. Accordingly, in defining and describing the present invention it should be understood that the "relatively linear" waveguide portion 12A is linear in the sense that its lateral dimensions are much less significant than the lateral dimensions of the lateral planar waveguide portions 12B and some of the other components of the wavelength conversion device 10.

Figure 5:
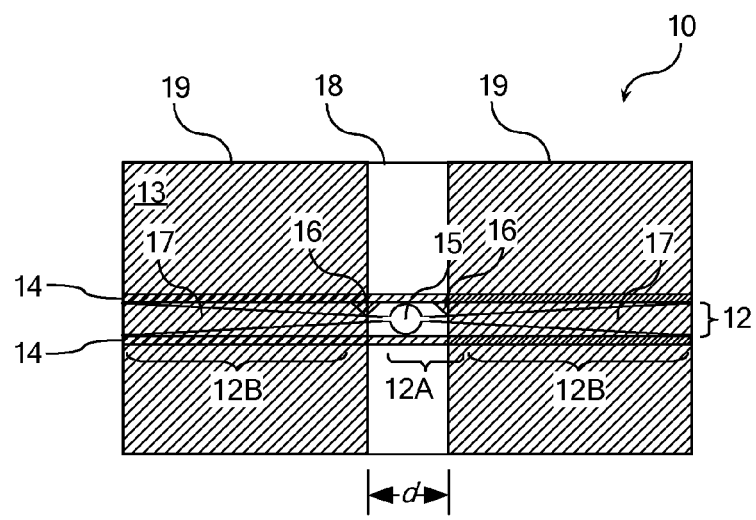
FIG. 5 is a schematic illustration of an alternative wavelength conversion device output face.

Referring collectively FIGS. 3 and 5, it is noted that the relatively non-transmissive lateral portions 19 of the output face 13 can be configured such that the lateral dimension d of the relatively transmissive core portion 18 can be tailored to a suitable value that will, in large part, depend on the preferences of a user of the wavelength conversion device 10. For example, and not by way of limitation, it is contemplated that the lateral dimension d of the relatively transmissive core portion 18 can be as small as a few microns or as large as approximately 100 μm, although it is contemplated that dimensions outside of this range may also be functional.

When arranging the relatively non-transmissive lateral portions 19 close to the optical trenches 16, as is illustrated in FIG. 5, care should be taken to ensure that the formation of the non-transmissive lateral portions 19 does not degrade the transmittance of the core portion 18. In many cases, to account for this potential degradation and make it easier to align the transmissive core portion 18 to span the optical trenches 16, the lateral dimension d illustrated in FIGS. 3 and 5 can be made significantly larger than the spacing between the optical trenches 16. For example, where the spacing between the optical trenches is about 5 μm and the relatively non-transmissive lateral portions 19 extend approximately 0.5 mm at the output face 13 the transmissive core portion 18 can be approximately 100 μm. Stated more broadly, the slit formed between the non-transmissive lateral portions 19 does not need to be precisely aligned with the optical trenches. For example, in many cases, by using a slit aperture on the order of about 100 μm with a waveguide dimension in the order of 5 microns, the alignment tolerances of the slit can be significantly reduced. In other cases, the lateral dimension d of the relatively transmissive core portion is at least twice as large as the lateral dimension of the relatively linear waveguide portion, as defined by the spacing between the optical trenches 16.

It is also noted that terms like "preferably," "commonly," and "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Referring collectively to the present invention, as illustrated in FIGS. 1-5, it is noted that in each illustration, the slit formed between the relatively non-transmissive lateral portions 19 is affixed to or formed as an integral part of the wavelength conversion device 10. However, it is contemplated that the relatively non-transmissive portions 19 may also be presented in the form of an independent filtering slit that is displaced from the output face 13.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation, e.g., "substantially above zero," varies from a stated reference, e.g., "zero," and should be interpreted to require that the quantitative representation varies from the stated reference by a readily discernable amount.

It is also noted that recitations herein of a component of the present invention being "structured" or "configured" in a particular way, to embody a particular property, or function in a particular manner, are structural recitations as opposed to recitations of intended use. More specifically, the references herein to the manner in which a component is "structured" or "configured" denote an existing physical condition of the component and, as such, are to be taken as a definite recitation of the structural characteristics of the component.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A laser projection system comprising a laser source, a wavelength conversion device, and beam projection optics, wherein:
the wavelength conversion device comprises an input face, an output face, and a waveguide region extending from the input face to the output face;
the waveguide region is confined between a pair of cladding layers and comprises a relatively linear waveguide portion and a pair of lateral planar waveguide portions;
the output face of the wavelength conversion device comprises a multi-component output face comprising a core portion and a pair of lateral portions;
the core portion of the output face is configured to be relatively transmissive to an optical signal propagating from the input face to the output face along the waveguide region;
the lateral portions of the output face are configured to be relatively non-transmissive to an optical signal propagating from the input face to the output face along the waveguide region;
the waveguide region is structured such that an optical signal propagating from the input face to the output face along the waveguide region will define a relatively high intensity spot in substantial alignment with the relatively linear waveguide portion along the core portion of the output face and will be subject to a degree of scattering to define relatively low intensity laterally distributed parasitic light in substantial alignment with the lateral planar waveguide portions along the lateral portions of the output face; and
the beam projection optics are structured to project the optical signals towards an image field of the laser projection system.

2. A laser projection system as claimed in claim 1 wherein the lateral portions of the output face are configured to reflect or scatter an optical signal propagating from the input face to the output face along the waveguide region.

3. A laser projection system as claimed in claim 1 wherein the lateral portions of the output face are configured to absorb an optical signal propagating from the input face to the output face along the waveguide region.

4. A laser projection system as claimed in claim 1 wherein the lateral portions of the output face are configured to diffuse an optical signal propagating from the input face to the output face along the waveguide region.

5. A laser projection system as claimed in claim 1 wherein the lateral portions of the output face comprise relatively non-transmissive roughened surface portions.

6. A laser projection system as claimed in claim 1 wherein the lateral portions of the output face comprise relatively non-transmissive coatings formed on the output face of the wavelength conversion device.

7. A laser projection system as claimed in claim 1 wherein the lateral portions of the output face comprise relatively non-transmissive compositional variations formed in the output face of the wavelength conversion device.

8. A laser projection system as claimed in claim 1 wherein the waveguide region comprises a layer of second harmonic generating material sandwiched between a pair of cladding layers.

9. A laser projection system as claimed in claim 8 wherein one of the pair of cladding layers extends into a pair of relatively low index optical trenches disposed on opposite sides of the relatively linear waveguide portion.

10. A laser projection system as claimed in claim 8 wherein the layer of second harmonic generating material and the pair of cladding layers extend laterally so as to span the relatively linear waveguide portion and the pair of lateral planar waveguide portions.

11. A laser projection system as claimed in claim 8 wherein the layer of second harmonic generating material and the pair of cladding layers extend laterally so as to span substantially an entire width of the wavelength conversion device.

12. A laser projection system as claimed in claim 1 wherein a lateral dimension of the relatively transmissive core portion exceeds a lateral dimension of the relatively linear waveguide portion.

13. A laser projection system as claimed in claim 12 wherein a lateral dimension of the relatively transmissive core portion is at least twice as large as a lateral dimension of the relatively linear waveguide portion.

14. A laser projection system as claimed in claim 1 wherein the relatively linear waveguide portion is partially separated from the pair of lateral planar waveguide portions by relatively low index optical trenches disposed on opposite sides of the relatively linear waveguide portion.

15. A laser projection system comprising a laser source, a wavelength conversion device, a filtering slit, and beam projection optics, wherein:
the wavelength conversion device comprises an input face, an output face, and a waveguide region extending from the input face to the output face;
the waveguide region is confined between a pair of cladding layers and comprises a relatively linear waveguide portion and a pair of lateral planar waveguide portions;
the filtering slit comprises a core portion that is relatively transmissive to an optical signal propagating from the output face of the wavelength conversion device and lateral portions that are relatively non-transmissive to an optical signal propagating from the output face of the wavelength conversion device;
the waveguide region and the filtering slit are arranged such that an optical signal propagating from the input face to the output face along the waveguide region will define a relatively high intensity spot in substantial alignment with the relatively linear waveguide portion and the relatively transmissive core portion of filtering slit and will be subject to a degree of scattering to define relatively low intensity laterally distributed parasitic light in substantial alignment with the lateral planar waveguide portions and the relatively non-transmissive lateral portions of the filtering slit; and
the beam projection optics are structured to project the optical signals towards an image field of the laser projection system, downstream of the filtering slit.

16. A wavelength conversion device comprising an input face, an output face, and a waveguide region extending from the input face to the output face, wherein:
the waveguide region is confined between a pair of cladding layers and comprises a relatively linear waveguide portion and a pair of lateral planar waveguide portions;
the output face of the wavelength conversion device comprises a multi-component output face comprising a core portion and a pair of lateral portions;
the core portion of the output face is configured to be relatively transmissive to an optical signal propagating from the input face to the output face along the waveguide region;

the lateral portions of the output face are configured to be relatively non-transmissive to an optical signal propagating from the input face to the output face along the waveguide region; and the waveguide region is structured such that an optical signal propagating from the input face to the output face along the waveguide region will define a relatively high intensity spot in substantial alignment with the relatively linear waveguide portion along the core portion of the output face and will be subject to a degree of scattering to define relatively low intensity laterally distributed parasitic light in substantial alignment with the lateral planar waveguide portions along the lateral portions of the output face.

* * * * *